US012460077B2

(12) United States Patent
Wacker et al.

(10) Patent No.: US 12,460,077 B2
(45) Date of Patent: Nov. 4, 2025

(54) CURABLE RESIN COMPOSITIONS CONTAINING AN ALIPHATIC POLYKETONE TOUGHENER AND COMPOSITES MADE THEREFROM

(71) Applicant: Huntsman Advanced Materials Americas LLC, The Woodlands, TX (US)

(72) Inventors: Kevin Wacker, The Woodlands, TX (US); Dong Le, The Woodlands, TX (US); Derek Kincaid, The Woodlands, TX (US)

(73) Assignee: HUNTSMAN ADVANCED MATERIALS AMERICAS LLC, The Woodlands, TX (US)

( * ) Notice: Subject to any disclaimer, the term of this patent is extended or adjusted under 35 U.S.C. 154(b) by 672 days.

(21) Appl. No.: 17/783,368

(22) PCT Filed: Dec. 4, 2020

(86) PCT No.: PCT/US2020/063265
§ 371 (c)(1),
(2) Date: Jun. 8, 2022

(87) PCT Pub. No.: WO2021/118875
PCT Pub. Date: Jun. 17, 2021

(65) Prior Publication Data
US 2023/0016920 A1  Jan. 19, 2023

Related U.S. Application Data

(60) Provisional application No. 62/946,085, filed on Dec. 10, 2019.

(51) Int. Cl.
| | | |
|---|---|---|
| C08L 63/00 | (2006.01) | |
| C08G 59/22 | (2006.01) | |
| C08G 59/32 | (2006.01) | |
| C08G 59/40 | (2006.01) | |
| C08G 67/02 | (2006.01) | |
| C08G 75/23 | (2006.01) | |
| C08J 5/24 | (2006.01) | |
| C08L 73/00 | (2006.01) | |

(52) U.S. Cl.
CPC .............. *C08L 63/00* (2013.01); *C08G 59/22* (2013.01); *C08G 59/32* (2013.01); *C08G 59/4064* (2013.01); *C08G 67/02* (2013.01); *C08G 75/23* (2013.01); *C08J 5/243* (2021.05); *C08L 73/00* (2013.01); *C08J 2363/00* (2013.01); *C08J 2473/00* (2013.01); *C08J 2481/06* (2013.01); *C08L 2203/30* (2013.01); *C08L 2205/02* (2013.01); *C08L 2205/035* (2013.01)

(58) Field of Classification Search
CPC ... C08L 63/00–10; C08L 73/00; C08G 67/02; C08J 2373/00; C08J 2473/00
See application file for complete search history.

(56) References Cited

U.S. PATENT DOCUMENTS

| | | | |
|---|---|---|---|
| 2,495,286 A * | 1/1950 | Brubaker | C08G 67/02 |
| | | | 568/451 |
| 3,756,984 A | 9/1973 | Klaren et al. | |
| 4,066,625 A | 1/1978 | Bolger | |
| 4,070,532 A * | 1/1978 | Hammer | C08L 73/00 |
| | | | 528/392 |
| 4,268,656 A | 5/1981 | Ray-Chaudhuri et al. | |
| 4,360,649 A | 11/1982 | Kamio et al. | |
| 4,427,802 A | 1/1984 | Moulton et al. | |
| 4,542,202 A | 9/1985 | Takeuchi et al. | |
| 4,546,155 A | 10/1985 | Hirose et al. | |
| 4,599,413 A | 7/1986 | Moulton et al. | |
| 4,761,449 A | 8/1988 | Lutz | |
| 4,808,699 A | 2/1989 | Van Broekhoven et al. | |
| 4,833,226 A | 5/1989 | Ishimura et al. | |
| 4,868,282 A | 9/1989 | Van Broekhoven et al. | |
| 4,885,328 A | 12/1989 | Danforth et al. | |
| 4,921,897 A | 5/1990 | Danforth et al. | |
| 4,935,304 A | 6/1990 | Danforth | |

(Continued)

FOREIGN PATENT DOCUMENTS

| | | |
|---|---|---|
| CA | 2128838 A1 | 1/1995 |
| CN | 108699219 A | 10/2018 |

(Continued)

OTHER PUBLICATIONS

Brubaker et al., "Synthesis and Characterization of Ethylene/Carbon Monoxide Copolymers, A New Class of Polyketones," J. Am. Chem. Soc. 74, 1509-1515 (Year: 1952).*
International Search Report and Written Opinion of corresponding EP Application No. 20898925.1 filed Jun. 23, 2022.
Veith Cary A: "Advances in Aliphatic Polyketone Composites SPE ACCE Presentation" XP093105640; Sep. 8, 2017 (Sep. 8, 2017), pp. 1-37.
Translation of Office Action issued Sep. 10, 2024 for corresponding Russian Application No. 2022117962 filed Jul. 1, 2022.

(Continued)

*Primary Examiner* — Kregg T Brooks
(74) *Attorney, Agent, or Firm* — HUNTSMAN ADVANCED MATERIALS AMERICAS LLC; David K. Wooten

(57) ABSTRACT

The present disclosure provides a curable resin composition including a thermoset resin, an aliphatic polyketone as a toughener and a hardener. The curable resin composition may be combined with reinforcing fibers and then cured to form a fiber-reinforced composite article having a high glass transition temperature, excellent mechanical properties and low moisture absorption. The fiber-reinforced composite article may be used in various applications, such as in transport applications including aerospace, aeronautical, nautical and land vehicles.

15 Claims, No Drawings

(56) References Cited

U.S. PATENT DOCUMENTS

| | | |
|---|---|---|
| 5,134,239 A | 7/1992 | Bertram et al. |
| 5,151,327 A | 9/1992 | Nishiyama et al. |
| 5,407,978 A | 4/1995 | Bymark et al. |
| 5,430,112 A | 7/1995 | Sakata et al. |
| 5,439,977 A | 8/1995 | Yokota et al. |
| 5,464,910 A | 11/1995 | Nakatsuka et al. |
| 5,476,748 A | 12/1995 | Steinmann et al. |
| 5,543,486 A | 8/1996 | Abe et al. |
| 5,548,058 A | 8/1996 | Muroi et al. |
| 5,648,117 A | 7/1997 | Shiomi et al. |
| 5,717,011 A | 2/1998 | Griggs et al. |
| 5,733,954 A | 3/1998 | McKenzie et al. |
| 5,789,498 A | 8/1998 | Ohnishi et al. |
| 5,798,399 A | 8/1998 | Griggs et al. |
| 5,801,218 A | 9/1998 | McKenzie et al. |
| 5,929,151 A | 7/1999 | De Wit et al. |
| 11,198,756 B2 | 12/2021 | Zhou et al. |
| 2011/0245378 A1 | 10/2011 | Russ et al. |
| 2018/0186946 A1 | 7/2018 | Mori et al. |

FOREIGN PATENT DOCUMENTS

| | | | |
|---|---|---|---|
| EP | 0913428 A2 | 5/1999 | |
| EP | 2147035 B1 | 6/2011 | |
| JP | H11236488 A | 8/1999 | |
| KR | 101907152 B1 | 10/2018 | |
| RU | 2220166 C2 | 12/2003 | |
| RU | 2315784 C1 | 1/2008 | |
| WO | WO-2008130484 A1 * | 10/2008 | ............ B29C 70/00 |
| WO | 2019126073 A1 | 6/2019 | |
| WO | 2019241743 A1 | 12/2020 | |

OTHER PUBLICATIONS

Translation of Search Report issued Sep. 10, 2024 for corresponding Russian Application No. 2022117962 filed Jul. 1, 2022.
International Search Report and Written Opinion of PCT Application No. PCT/EP2020/63265 filed Dec. 4, 2020.
Translation of Office Action issued Mar. 13, 2024 for corresponding CN Application No. 202080085749.4 filed Jun. 10, 2022.

* cited by examiner

CURABLE RESIN COMPOSITIONS CONTAINING AN ALIPHATIC POLYKETONE TOUGHENER AND COMPOSITES MADE THEREFROM

CROSS-REFERENCE TO RELATED APPLICATION

This application is the National Phase of International Application PCT/US2020/063265 filed Dec. 4, 2020 which designated the U.S. and which claims priority to U.S. Provisional Patent Application Ser. No. 62/946,085, filed Dec. 10, 2019. The noted applications are incorporated herein by reference.

FIELD

The present disclosure generally relates to the use of aliphatic polyketones to modify properties, such as compression after impact and wet properties, of curable resin compositions. The present disclosure also relates to the use of such curable resin compositions which may be cured in the presence of reinforcing fibers to form fiber-reinforced composite articles, and to aerospace structural parts made from the fiber-reinforced composite articles.

BACKGROUND

Thermoset materials, such as cured epoxy resins, are known for their thermal and chemical resistance. They also display good mechanical properties, but frequently lack toughness and tend to be very brittle. This is especially true as their crosslink density increases or the monomer functionality increases above two. Attempts have been made to strengthen or toughen epoxy resins and other thermoset materials (e.g., bismaleimide resins, benzoxazine resins, cyanate ester resins, epoxy vinyl ester resins and unsaturated polyester resins) by incorporating therein a variety of toughener materials.

Such tougheners may be compared to one another by their structural, morphological, or thermal properties. The structural backbone of the toughener may be aromatic, aliphatic, or both aromatic and aliphatic. Aromatic tougheners, such as polyether ether ketone or polyimides, provide thermoset materials which exhibit reasonable improvements in toughening, namely compression after impact and, because of the aromatic structure of the toughener, low moisture uptake when subjected to hot-wet environments. Conversely, aliphatic tougheners, such as nylon (a.k.a. polyamide), provide thermoset materials which exhibit a significant improvement in compression after impact but higher than desired moisture uptake when subjected to hot-wet environments which can lead to a diminishment in compression strength and compression modulus. Other tougheners, such as core-shell polymers, can provide thermoset materials which exhibit good damage resistance. However, these tougheners tend to negatively affect the processability and glass transition temperature of the thermoset material.

Therefore, a need exists to further improve upon the state of the art by utilizing new tougheners in a curable resin composition that, upon curing of the resin composition, allows the cured product to exhibit a high glass transition temperature, excellent mechanical properties and low moisture absorption such that, when subjected to hot-wet environments, its thermomechanical properties are not diminished.

SUMMARY

The present disclosure generally provides a curable resin composition including (a) a thermoset resin (b) an aliphatic polyketone toughener and (c) a hardener. The present disclosure also provides a fiber-reinforced resin composition including reinforcing fibers and the curable resin composition of the present disclosure. The fiber-reinforced resin composition may be cured to form a fiber-reinforced composite article which may find use in a variety of applications, such as in transport applications (including aerospace, aeronautical, nautical and land vehicles, and including the automotive, rail and coach industries), in building/construction applications or in other commercial applications.

DETAILED DESCRIPTION

The present disclosure generally provides a curable resin composition comprising (a) a thermoset resin, (b) an aliphatic polyketone as a toughener, and (c) a hardener. Although the curable resin composition may be used alone, the composition may be combined with reinforcing fibers to form a fiber-reinforced resin composition and cured to form a fiber-reinforced composite article. It has been surprisingly found that the presence of the aliphatic polyketone toughener may allow the composite article to display chemical and mechanical properties that are especially suitable for primary and secondary aerospace structural applications as well as structural materials in other moving bodies including cars, boats and railway carriages. Notably, the fiber-reinforced composite article may exhibit good compression after impact (CAI), a glass transition of at least 190° C. and the ability to retain key mechanical properties after hot-wet conditioning.

The following terms shall have the following meanings:

The term "cure", "cured" or similar terms like "curing" or "cure" refers to the hardening of a thermoset resin by chemical cross-linking. The term "curable" means that the composition is capable of being subjected to conditions which will render the composition to a cured or thermoset state or condition.

The term "comprising" and derivatives thereof are not intended to exclude the presence of any additional component, step or procedure, whether or not the same is disclosed herein. In order to avoid any doubt, all compositions claimed herein through use of the term "comprising" may include any additional additive or compound, unless stated to the contrary. In contrast, the term, "consisting essentially of" if appearing herein, excludes from the scope of any succeeding recitation any other component, step or procedure, excepting those that are not essential to operability and the term "consisting of", if used, excludes any component, step or procedure not specifically delineated or listed. The term "or", unless stated otherwise, refers to the listed members individually as well as in any combination.

The articles "a" and "an" are used herein to refer to one or more than one (i.e., to at least one) of the grammatical object of the article. By way of example, "an epoxy resin" means one epoxy resin or more than one epoxy resin.

The phrases "in one embodiment", "according to one embodiment" and the like generally mean the particular feature, structure, or characteristic following the phrase is included in at least one aspect of the present disclosure, and may be included in more than one embodiment of the present disclosure. Importantly, such phrases do not necessarily refer to the same embodiment.

If the specification states a component or feature "may", "can", "could", or "might" be included or have a characteristic, that particular component or feature is not required to be included or have the characteristic.

The term "about" as used herein can allow for a degree of variability in a value or range, for example, it may be within 10%, within 5%, or within 1% of a stated value or of a stated limit of a range.

Values expressed in a range format should be interpreted in a flexible manner to include not only the numerical values explicitly recited as the limits of the range, but to also include all of the individual numerical values or sub-ranges encompassed within that range as if each numerical value and sub-range is explicitly recited. For example, a range such as from 1 to 6, should be considered to have specifically disclosed sub-ranges, such as, from 1 to 3, from 2 to 4, from 3 to 6, etc., as well as individual numbers within that range, for example, 1, 2, 3, 4, 5, and 6. This applies regardless of the breadth of the range.

The terms "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

According to a first embodiment, the present disclosure provides a curable resin composition that generally includes (a) a thermoset resin, (b) an aliphatic polyketone, and (c) a hardener.

In one embodiment, the thermoset resin may be an epoxy resin, a bismaleimide resin, a benzoxazine resin, a cyanate ester resin, a phenolic resin, a vinyl ester resin or a mixture thereof. In one particular embodiment, the thermoset resin is an epoxy resin.

In general, any epoxy-containing compound is suitable for use as the epoxy resin in the present disclosure, such as the epoxy-containing compounds disclosed in U.S. Pat. No. 5,476,748 which is incorporated herein by reference. According to one embodiment, the epoxy resin is selected from a difunctional (thus having two epoxide groups), a trifunctional (thus having three epoxide groups), a tetrafunctional (thus having four epoxide groups) and a mixture thereof.

Illustrative non-limiting examples of difunctional epoxy resins are: bisphenol A diglycidyl ether, bisphenol F diglycidyl ether, tetrabromobisphenol A diglycidyl ether, propylene glycol diglycidyl ether, butylene glycol diglycidyl ether, ethylene glycol diglycidyl ether, neopentyl glycol diglycidyl ether, 1,4-butanediol diglycidyl ether, 1,6-hexanediol diglycidyl ether, cyclohexanedimethanol diglycidyl ether, polyethylene glycol diglycidyl ether, polypropylene glycol diglycidyl ether, polytetramethylene glycol diglycidyl ether, resorcinol diglycidyl ether, neopentyl glycol diglycidyl ether, bisphenol A polyethylene glycol diglycidyl ether, bisphenol A polypropylene glycol diglycidyl ether, 3,4-epoxycyclohexylmethyl carboxylate, hexahydrophthalic acid diglycidyl ester, methyltetrahydrophthalic acid diglycidyl ester, and mixtures thereof.

Illustrative non-limiting examples of trifunctional epoxy resins are: triglycidyl ether of para-aminophenol, triglycidyl ether of meta-aminophenol, dicyclopentadiene based epoxy resins, N,N,O-triglycidyl-4-amino-m- or -5-amino-o-cresol type epoxy resins, and a 1,1,1-(triglycidyloxyphenyl)methane type epoxy resin.

Illustrative non-limiting examples of tetrafunctional epoxy resins are: N,N,N',N'-tetraglycidyl methylene dianiline, N,N,N',N'-tetraglycidyl-m-xylenediamine, tetraglycidyl diaminodiphenyl methane, sorbitol polyglycidyl ether, pentaerythritol tetraglycidyl ether, tetraglycidyl bisamino methyl cyclohexane and tetraglycidyl glycoluril.

In one embodiment, the amount of the epoxy resin present in the curable resin composition may be an amount of between about 10 wt. % to about 90 wt. %, or between about 15 wt. % to about 75 wt. %, or between about 20 wt. % to about 60 wt. %, or between about 25 wt. % to about 55 wt. %, based on the total weight of the curable resin composition.

In yet another embodiment, the epoxy resin may be comprised of at least one trifunctional epoxy resin or tetrafunctional epoxy resin or mixture thereof together with at least one difunctional epoxy resin. In such embodiments, the difunctional epoxy resin may be present in the curable resin composition in an amount of between about 10 wt. % to 40 wt. %, or between about 12 wt. % to about 25 wt. %, or between about 15 wt. % to 20 wt. %, based on the total weight of the curable resin composition and the trifunctional epoxy resin and/or tetrafunctional epoxy resin may be present in the curable resin composition in an amount of between about 15 wt. % to 50 wt. %, or between about 20 wt. % to about 40 wt. %, or between about 25 wt. % to 35 wt. %, based on the total weight of the curable resin composition. In one particular embodiment, the curable resin composition may include the difunctional resin in the amounts above, the trifunctional epoxy resin in an amount of between about 5 wt. % to about 30 wt. % and the tetrafunctional epoxy resin in an amount of between about 10 wt. % to about 35 wt. %, based on the total weight of the curable resin composition.

The curable resin composition also includes an aliphatic polyketone as a toughener. Such aliphatic polyketones are linear alternating polymers of carbon monoxide and at least one ethylenically unsaturated hydrocarbon and are distinguished by the absence of aromatic groups along the polymer backbone. In some embodiments, the aliphatic polyketones will contain substantially one molecule of carbon monoxide for each molecule of ethylenically unsaturated hydrocarbon.

It is possible to employ a number of different ethylenically unsaturated hydrocarbons as monomers within the same aliphatic polyketone. According to one embodiment, the ethylenically unsaturated hydrocarbon includes those compounds that are wholly aliphatic, and in some embodiments may have up to about 20 carbon atoms, or in other embodiments up to about 10 carbon atoms. Non-limiting examples of ethylenically unsaturated hydrocarbons include ethylene, propylene, n-butene, n-octene, n-dodecene, and other α-olefins. Thus, for example, the aliphatic polyketone may be a copolymer of carbon monoxide and ethylene or a terpolymer of carbon monoxide, ethylene and a second ethylenically unsaturated hydrocarbon of at least 3 carbon atoms, such as propylene. Additional monomers can also be used and still come within the scope of aliphatic polyketone described herein. That is, the aliphatic polyketone may be made from four, five, or more combinations of ethylenically unsaturated hydrocarbon monomers.

When the aliphatic polyketone is a terpolymer, there will be within the terpolymer at least about 2 units incorporating a moiety of ethylene for each unit incorporating a moiety of the second or subsequent ethylenically unsaturated hydrocarbon. In some embodiments, there may be from about 10 units to about 100 units incorporating a moiety of the second ethylenically unsaturated hydrocarbon.

The polymer chain of the aliphatic polyketone may therefore be represented by the repeating formula —[CH$_2$—CH$_2$—CO]$_x$—[G—CO]$_y$— where G is a moiety of the ethylenically unsaturated hydrocarbon of at least 3 carbon atoms polymerized through the ethylenic unsaturation and the ratio of y:x is no more than about 0.5. When copolymers of carbon monoxide and ethylene are employed, there will be no second ethylenically unsaturated hydrocarbon present and the aliphatic polyketone is represented by the above formula where y is 0. When y is other than zero, i.e., terpolymers are employed, the [CH$_2$—CH$_2$—CO] units and the [G—CO] units are distributed randomly throughout the polymer chain, and ratios of y:x may be from about 0.01 to about 0.1. In some embodiments, the aliphatic polyketone may have a number average molecular weight of between about 1000 to about 200,000 or between about 20,000 to about 90,000. In other embodiments, the aliphatic polyketone may have a glass transition temperature of less than about 50° C., or less than about 40° C., or less than about 35° C., or less than about 25° C.

The aliphatic polyketones may be produced by contacting carbon monoxide and ethylenically unsaturated hydrocarbon (s) under polymerization conditions in the presence of a catalytic amount of a catalyst formed from a compound of the Group VIII metals (for e.g., palladium, cobalt, and nickel), the anion of a non-hydrohalogenic acid having a pKa less than about 6, and a bidentate ligand of phosphorus, sulfur, arsenic, or antimony. Although the scope of the polymerization is extensive, for purposes of illustration, a suitable Group VIII metal compound is palladium acetate, suitable anions are a trifluoroacetic acid anion or a para-toluenesulfonic acid anion, and a suitable bidentate ligands are 1,3-bis(diphenylphosphino)propane or 1,3-bis[di(2-methoxyphenyl)phosphino]propane.

Polymerization of the aliphatic polyketone can be carried out under conventional polymerization conditions, typically at elevated temperature and pressure. Polymerization can be carried out in the gaseous phase, or in the liquid phase in the presence of an inert diluent, for example, a lower alcohol such as methanol or ethanol. The reactants can be contacted by conventional methods such as stirring or shaking, and, subsequent to reaction, the aliphatic polyketone product can be recovered, for example, by decantation or filtration. The product may contain metallic residues from the catalyst, which can be removed by contact with a solvent which is selective for the residues. Further details regarding the preparation of aliphatic polyketones are set forth, for example, in U.S. Pat. Nos. 4,808,699; 4,868,282; 4,761,449; 4,885,328; 4,921,897; 4,935,304; and 5,648,117, the respective disclosures of which are hereby incorporated by reference herein.

Thus, in one embodiment, the curable resin composition of the present disclosure may contain the aliphatic polyketone in an amount of between about 1 wt. % to about 30 wt %, or between about 2 wt. % to about 25 wt %, or between about 3 wt. % to about 20 wt %, or between about 4 wt. % to about 17.5 wt %, or between about 5 wt. % to about 15 wt %, or even between about 6 wt. % to about 12.5 wt %, based on the total weight of the curable resin composition.

According to another embodiment, hardening of the curable resin composition may be accomplished by the addition of any chemical material(s) known in the art for curing such adhesives. Such materials are compounds that have a reactive moiety that can react with the epoxy group of the epoxy resin and are referred to herein as "hardeners" but also include the materials known to those skilled in the art as curing agents, curatives, activators, catalysts or accelerators. While certain hardeners promote curing by catalytic action, others participate directly in the reaction of the resin and are incorporated into the thermoplastic polymeric network formed by condensation, chain-extension and/or cross-linking of the resin. Depending on the hardener, heat may or may not be required for significant reaction to occur. Hardeners for the epoxy resin include, but are not limited to aromatic amines, cyclic amines, aliphatic amines, alkyl amines, polyether amines, including those polyether amines that can be derived from polypropylene oxide and/or polyethylene oxide, 9,9-bis(4-amino-3-chlorophenyl)fluorene (CAF), acid anhydrides, carboxylic acid amides, polyamides, polyphenols, cresol and phenol novolac resins, imidazoles, guanidines, substituted guanidines, substituted ureas, melamine resins, guanamine derivatives, tertiary amines, Lewis acid complexes, such as boron trifluoride and boron trichloride and polymercaptans. Any epoxy-modified amine products, Mannich modified products, and Michael modified addition products of the hardeners described above may also be used. All of the above mentioned curatives may be used either alone or in any combination.

In one embodiment, the hardener is a multifunctional amine. The term "multifunctional amine" as used herein refers to an amine having at least two primary and/or secondary amino groups in a molecule. For example, the multifunctional amine may be an aromatic multifunctional amine having two amino groups bonded to benzene at any one of ortho, meta and para positional relations, such as phenylenediamine, xylenediamine, 1,3,5-triaminobenzene, 1,2,4-triaminobenzene and 3,5-diaminobenzoic acid, an aliphatic multifunctional amine such as ethylenediamine and propylenediamine, an alicyclic multifunctional amine such as 1,2-diaminocyclohexane, 1,4-diaminocyclohexane, piperazine, 1,3-bispiperidylpropane and 4-aminomethylpiperazine, and the like. These multifunctional amines may be used alone or in a mixture thereof.

Exemplary aromatic amines include, but are not limited to 1,8 diaminonaphthalene, m-phenylenediamine, diethylene toluene diamine, diaminodiphenylsulfone, diaminodiphenylmethane, diaminodimethyldiphenylmethane, 4,4'-methylenebis(2,6-diethylaniline), 4,4'-methylenebis(2-isopropyl-6-methylaniline), 4,4'-methylenebis(2,6-diisopropylaniline), 4,4'-methylenebis(3-chloro-2,6-diethylaniline), 4,4'-[1,4-phenylenebis(1-methyl-ethylindene)]bisaniline, 4,4'-[1,3-phenylenebis(1-methyl-ethylindene)]bisaniline, 1,3-bis(3-aminophenoxy)benzene, bis-[4-(3-aminophenoxy)phenyl]sulfone, bis-[4-(4-aminophenoxy)phenyl]sulfone, 2,2'-bis[4-(4-aminophenoxy)phenyl]propane. Furthermore, the aromatic amines may include heterocyclic multifunctional amine adducts as disclosed in U.S. Pat. Nos. 4,427,802 and 4,599,413, which are both hereby incorporated by way of reference in their entirety.

Examples of cyclic amines include, but are not limited to bis(4-amino-3-methyldicyclohexyl)methane, diaminodicyclohexylmethane, bis(aminomethyl)cyclohexane, N-aminoethylpyrazine, 3,9-bis(3-aminopropyl)-2,4,8,10-tetraoxaspiro(5,5)undecane, m-xylenediamine, isophoronediamine, menthenediamine, 1,4-bis(2-amino-2-methylpropyl) piperazine, N,N'-dimethylpiperazine, pyridine, picoline, 1,8-diazabicyclo[5,4,0]-7-undecene, benzylmethylamine, 2-(dimethylaminomethyl)-phenol, 2-methylimidazole, 2-phenylimidazole, and 2-ethyl-4-methylimidazole.

Exemplary aliphatic amines include, but are not limited to diethylenetriamine, triethylenetetramine, tetraethylenepentamine, 3-(dimethylamino)propylamine, 3-(diethylamino)- propylamine, 3-(methylamino)propylamine, tris(2-aminoethyl)amine; 3-(2-ethylhexyloxy)propylamine, 3-ethoxypropylamine, 3-methoxypropylamine, 3-(dibutylamino)propylamine, and tetramethyl-ethylenediamine; ethylenediamine; 3,3'-iminobis(propylamine), N-methyl-3,3'-iminobis(propylamine); allylamine, diallylamine, triallylamine, polyoxypropylenediamine, and polyoxypropylenetriamine.

Exemplary alkyl amines include, but are not limited to methylamine, ethylamine, propylamine, isopropylamine, butylamine, sec-butylamine, t-butylamine, n-octylamine, 2-ethylhexylamine, dimethylamine, diethylamine, dipropylamine, diisopropylamine, dibutylamine, di-sec-butylamine, di-t-butylamine, di-n-octylamine and di-2-ethylhexylamine.

Exemplary acid anhydrides include, but are not limited to, cyclohexane-1,2-dicarboxylic acid anhydride, 1-cyclohexene-1,2-dicarboxylic acid anhydride, 2-cyclohexene-1,2-dicarboxylic acid anhydride, 3-cyclohexene-1,2-dicarboxylic acid anhydride, 4-cyclohexene-1,2-dicarboxylic acid anhydride, 1-methyl-2-cyclohexene-1,2-dicarboxylic acid anhydride, 1-methyl-4-cyclohexene-1,2-dicarboxylic acid anhydride, 3-methyl-4-cyclohexene-1,2-dicarboxylic acid anhydride, 4-methyl-4-cyclohexene-1,2-dicarboxylic acid anhydride, dodecenylsuccinic anhydride, succinic anhydride, 4-methyl-1-cyclohexene-1,2-dicarboxylic acid anhydride, phthalic anhydride, hexahydrophthalic anhydride, nadic methyl anhydride, dodecenylsuccinic anhydride, tetrahydrophthalic anhydride, maleic anhydride, pyromellitic dianhydride, trimellitic anhydride, benzophenonetetracarboxylic dianhydride, bicyclo[2.2.1]hept-5-ene-2,3-dicarboxylic anhydride, methylbicyclo[2.2.1]hept-5-ene-2,3-dicarboxylic anhydride, bicyclo[2.2.1]hept-5-ene-2,3-dicarboxylic anhydride, dichloromaleic anhydride, chlorendic anhydride, tetrachlorophthalic anhydride and any derivative or adduct thereof.

Exemplary imidazoles include, but are not limited to, imidazole, 1-methylimidazole, 2-methylimidazole, 2-ethylimidazole, 2-isopropylimidazole, 2-n-propylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-isopropyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 2-phenyl-4-methyl-5-hydroxymethylimidazole, 2-phenylimidazole, 2-phenyl-4,5-dihydroxymethylimidazole, 1,2-phenyl-4-methyl-5-hydroxymethylimidazole, 1-dodecyl-2-methylimidazole and 1-cyanoethyl-2-phenyl-4,5-di(2-cyanoethoxy)methylimidazole.

Exemplary substituted guanidines are methylguanidine, dimethylguanidine, trimethylguanidine, tetramethylguanidine, methylisobiguanidine, dimethylisobiguanidine, tetramethylisobiguanidine, hexamethylisobiguanidine, heptamethylisobiguanidine and cyanoguanidine (dicyandiamide). Representatives of guanamine derivatives which may be mentioned are alkylated benzoguanamine resins, benzoguanamine resins or methoxymethylethoxymethylbenzoguanamine. Substituted ureas may include p-chlorophenyl-N,N-dimethylurea (monuron), 3-phenyl-1,1-dimethylurea (fenuron) or 3,4-dichlorophenyl-N,N-dimethylurea (diuron).

Exemplary tertiary amines include, but are not limited to, trimethylamine, tripropylamine, triisopropylamine, tributylamine, tri-sec-butylamine, tri-t-butylamine, tri-n-octylamine, N,N-dimethylaniline, N,N-dimethyl-benzylamine, pyridine, N-methylpiperidine, N-methylmorpholine, N,N-dimethylaminopyridine, derivatives of morpholine such as bis(2-(2,6-dimethyl-4-morpholino)ethyl)-(2-(4-morpholino)ethyl)amine, bis(2-(2,6-dimethyl-4-morpholino)ethyl)-(2-(2,6-diethyl-4-morpholino)ethyl)amine, tris(2-(4-morpholino)ethyl)amine, and tris(2-(4-morpholino)propyl)amine, diazabicyclooctane (DABCO), and heterocyclic compounds having an amidine bonding such as 1,8-diazabicyclo[5.4.0]undec-7-ene.

Amine-epoxy adducts are well-known in the art and are described, for example, in U.S. Pat. Nos. 3,756,984, 4,066,625, 4,268,656, 4,360,649, 4,542,202, 4,546,155, 5,134,239, 5,407,978, 5,543,486, 5,548,058, 5,430,112, 5,464,910, 5,439,977, 5,717,011, 5,733,954, 5,789,498, 5,798,399 and 5,801,218, each of which is incorporated herein by reference in its entirety. Such amine-epoxy adducts are the products of the reaction between one or more amine compounds and one or more epoxy compounds. Preferably, the adduct is a solid which is insoluble in the epoxy resin at room temperature, but which becomes soluble and functions as an accelerator to increase the cure rate upon heating. While any type of amine can be used (with heterocyclic amines and/or amines containing at least one secondary nitrogen atom being preferred), imidazole compounds are particularly preferred. Illustrative imidazoles include 2-methyl imidazole, 2,4-dimethyl imidazole, 2-ethyl-4-methyl imidazole, 2-phenyl imidazole and the like. Other suitable amines include, but are not limited to, piperazines, piperidines, pyrazoles, purines, and triazoles. Any kind of epoxy compound can be employed as the other starting material for the adduct, including mono-functional, and multi-functional epoxy compounds such as those described previously with regard to the epoxy resin component.

In one embodiment, the curable resin composition of the present disclosure may contain the hardener in an amount of between about 5 wt. % to about 60 wt. %, or between about 10 wt. % to about 50 wt. %, or between about 15 wt. % to about 45 wt. %, or between about 20 wt. % to about 40 wt. %, based on the total weight of the curable resin composition.

In another embodiment, the curable resin composition may include an additional toughener other than the aliphatic polyketone. Examples of such additional tougheners include, but are not limited to, polyether sulphone (PES), polyether ethersulphone (PEES), polyphenyl sulphone, polysulphone, polyimide, polyetherimide, aramid, polyamide, polyester, polyetheretherketone (PEEK), polyurethane, polyurea, polyarylether, polyarylsulphides, polycarbonates, polyphenylene oxide (PPO), modified PPO and mixtures thereof.

In some embodiments, the amount of such additional tougheners present in the curable composition may be an amount of between about 0.5 wt. % to about 30 wt. %, or between about 1 wt. % to about 25 wt. %, or between about 2 wt. % to about 20 wt. % or between about 5 wt. % to about 15 wt. %, based on the total weight of the curable resin composition.

In yet another embodiment, the curable resin composition may also contain one or more other additives which are useful for their intended uses. For example, the optional additives useful may include, but are not limited to, diluents, stabilizers, surfactants, flow modifiers, release agents, matting agents, degassing agents, thermoplastic particles (for e.g. carboxyl terminated liquid butadiene acrylonitrile rubber (CTBN), acrylic terminated liquid butadiene acrylonitrile rubber (ATBN), epoxy terminated liquid butadiene acrylonitrile rubber (ETBN), liquid epoxy resin (LER)

adducts of elastomers and preformed core-shell rubbers), curing initiators, curing inhibitors, wetting agents, processing aids, fluorescent compounds, UV stabilizers, antioxidants, impact modifiers, corrosion inhibitors, tackifiers, high density particulate fillers (e.g., various naturally occurring clays, such as kaolin, bentonite, montmorillonite or modified montmorillonite, attapulgate and Buckminsterfuller's earth; other naturally occurring or naturally derived materials, such as mica, calcium carbonate and aluminum carbonate; various oxides, such as ferric oxide, titanium dioxide, calcium oxide and silicon dioxide (e.g., sand); various man-made materials, such as precipitated calcium carbonate; and various waste materials such as crushed blast furnace slag), conducting particles (e.g., silver, gold, copper, nickel, aluminum and conducting grades of carbon and carbon nanotubes) and mixtures thereof.

When present, the amount of additives included in the curable resin composition may be in an amount of at least about 0.5% by weight, or at least 2% by weight, or at least 5% by weight or at least 10% by weight, based on the total weight of the curable resin composition. In other embodiments, the amount of additives included in the curable resin composition may be no more than about 30 wt. %, or no more than 25 wt. % by weight, or no more than 20 wt. % or no more than 15 wt. %, based on the total weight of the curable resin composition.

The curable resin composition may be prepared for example, by premixing individual components and then mixing these premixes, or by mixing all of the components together using customary devices, such as a stirred vessel, stirring rod, ball mill, sample mixer, static mixer, high shear mixer, ribbon blender or by hot melting.

Thus, according to another embodiment, the curable resin composition of the present disclosure may be prepared by mixing together from about 10 wt. % to about 90 wt. % of the epoxy resin and from about 1 wt. % to about 30 wt % of the aliphatic polyketone and from about 5 wt. % to about 60 wt. % of the hardener, where the wt. % is based on the total weight of the curable resin composition.

Thermosets can be formed from the curable resin composition of the present disclosure by mixing the epoxy resin, aliphatic polyketone and hardener at proportions as described before and then curing the curable resin composition. In some embodiments, it may be generally necessary to heat the composition to an elevated temperature to obtain a rapid cure. In a molding process, such as a process for making fiber-reinforced composite articles, the curable resin composition may be introduced into a mold, which may, together with any reinforcing fibers and/or inserts as may be contained in the mold, be preheated. The curing temperature may be, for example, from about 60° C. to up to about 190° C. When a long (at least 5 minutes, preferably at least 10 minutes) gel time is desirable, the curing temperature preferably is not greater than 150° C. When both a long gel time and a short demold time is wanted, a suitable curing temperature may be about 100° C. to about 150° C., preferably 110 to 150° C. and especially 120 to 150° C. In some embodiments, it may be preferred to continue the cure until the resulting composite attains a glass transition temperature in excess of the cure temperature. The glass transition temperature at the time of demolding may be at least about 100° C., or at least about 110° C., or at least about 120° C. or even at least about 130° C. Demold times at cure temperatures of about 95° C. to about 120° C., especially about 105° C. to about 120° C., are typically 350 seconds or less, preferably 300 seconds or less, and more preferably 240 seconds or less.

Thus, according to one embodiment there is generally provided a process for producing a fiber-reinforced composite article including the steps of: (i) contacting the reinforcing fibers with the curable resin composition in a mold to coat and/or impregnate the reinforcing fibers; and (ii) curing the coated and/or impregnated reinforcing fibers at a temperature of at least about 120° C. or at least about 170° C. to about 190° C.

Accordingly, for fabricating high-performance composite materials and prepregs, reinforcing fibers may be combined with the curable resin composition to form a fiber-reinforced resin composition and this composition may then be cured. The curable resin composition may be combined with the reinforcing fibers in accordance with any of the known prepreg manufacturing techniques. The reinforcing fibers may be fully or partially impregnated with the curable resin composition. In an alternate embodiment, the curable resin composition may be applied to the reinforcing fibers as a separate layer, which is proximal to, and in contact with, the reinforcing fibers, but does not substantially impregnate the reinforcing fibers. The prepreg is typically covered on both sides with a protective film and rolled up for storage and shipment at temperatures that are typically kept well below room temperature to avoid premature curing. Any of the other prepreg manufacturing processes and storage/shipping systems may be used if desired.

Suitable reinforcing fibres may include, but are not limited to, fibers having a high tensile strength, such as greater than 500 ksi (or 3447 MPa). Fibers that are useful for this purpose include carbon or graphite fibers, glass fibers and fibers formed of silicon carbide, alumina, boron, quartz, and the like, as well as fibers formed from organic polymers such as for example polyolefins, poly(benzothiazole), poly(benzimidazole), polyarylates, poly(benzoxazole), aromatic polyamides, polyaryl ethers and the like, and may include mixtures having two or more such fibers. Preferably, the fibers are selected from glass fibers, carbon fibers and aromatic polyamide fibers. The reinforcing fibers may be used in the form of discontinuous or continuous tows made up of multiple filaments, as continuous unidirectional or multidirectional tapes, or as woven, noncrimped, or nonwoven fabrics. The woven form may be selected from plain, satin, or twill weave style. The noncrimped fabric may have a number of plies and fiber orientations.

The reinforcing fibers may be sized or unsized and may be present at a content of about 50 wt. % to about 90 wt. % by weight, preferably at least 55 wt. %, based on the total weight of the fiber-reinforced resin composition. For structural applications, it is preferred to use continuous fibers, for example glass or carbon fibers, especially at 30% to 70% by volume, more especially 50% to 70% by volume, based on the total volume of the fiber-reinforced resin composition.

To form a fiber-reinforced composite article, a plurality of curable, flexible prepreg plies may be laid up on a tool in a stacking sequence to form a prepreg layup. The prepreg plies within the layup may be positioned in a selected orientation with respect to one another, e.g., 0°, ±45°, 90°, etc. Prepreg layups may be manufactured by techniques that may include, but are not limited to, hand lay-up, automated tape layup (ATL), advanced fiber placement (AFP), and filament winding.

Each prepreg is composed of a sheet or layer of reinforcing fibers that has been impregnated with the curable resin composition within at least a portion of their volume. In one embodiment, the prepreg has a fiber volume fraction of between about 0.50 to 0.60 on the basis of the total volume of the prepreg.

The prepreg useful for manufacturing aerospace structures is usually a resin-impregnated sheet of unidirectional reinforcing fibers, typically, carbon fibers, which is often referred to as "tape" or "unidirectional tape" or "unitape". The prepregs may be fully impregnated prepregs or partially impregnated prepregs. The curable resin composition impregnating the reinforcing fibers may be in a partially cured or uncured state.

Typically, the prepreg is in a pliable or flexible form that is ready for laying up and molding into a three-dimensional configuration, followed by curing into a final fiber-reinforced composite part. This type of prepreg is particularly suitable for manufacturing load-bearing structural parts, such as wings, fuselages, bulkheads and control surfaces of aircrafts. Important properties of the cured prepregs are high strength and stiffness with reduced weight.

As noted above, curing of the prepreg layup is generally carried out at elevated temperatures up to about 190° C., preferably in the range of about 170° C. to about 190° C., and with use of elevated pressure to restrain deforming effects of escaping gases, or to restrain void formation, suitably at pressure of up to 10 bar (1 MPa), preferably in the range of 3 bar (0.3 MPa) to 7 bar (0.7 MPa). Preferably, the cure temperature is attained by heating at up to 5° C./min, for example 2° C./min to 3° C./min and is maintained for the required period of up to 9 hours, preferably up to 6 hours, for example 2 hours to 4 hours. The use of a catalyst in the curable resin composition may allow even lower cure temperatures. Pressure can be released throughout, and temperature can be reduced by cooling at up to 5° C./min, for example up to 3° C./min. Post-curing at temperatures in the range of about 190° C. up to about 350° C. and at atmospheric pressure may be performed, employing suitable heating rates.

Coating and/or impregnation may be affected by either a wet method or hot melt method. In the wet method, the curable resin composition is first dissolved in a solvent to lower viscosity, after which coating and/or impregnation of the reinforcing fibers is effected and the solvent is evaporated off using an oven or the like. In the hot melt method, coating and/or impregnation may be effected by directly coating and/or impregnating the reinforcing fibers with the curable resin composition which has been heated to reduce its viscosity, or alternatively, a coated film of the curable resin composition may first be produced on release paper or the like, and the film placed on one or both sides of the reinforcing fibers and heat and pressure applied to effect coating and/or impregnation.

In yet another embodiment there is generally provided a method for producing a fiber-reinforced composite article in a reaction injection molding (RIM) system. The process includes the steps of: a) introducing a fiber preform comprising reinforcing fibers into a mold; b) injecting the curable resin composition into the mold; c) allowing the curable resin composition to impregnate the fiber preform; and d) heating the impregnated fiber preform at a temperature of least about 100° C. or at least about 150° C. for a period of time to produce an at least partially cured fiber-reinforced composite article; and e) optionally subjecting the partially cured fiber-reinforced composite article to post curing operations at a temperature of from about 100° C. to about 350° C.

In an alternative embodiment, the present disclosure generally provides a method for producing a fiber-reinforced composite article in a vacuum assisted resin transfer molding (VaRTM) system. The process includes the steps of: a) introducing a fiber preform comprising reinforcing fibers into a mold; b) injecting the curable resin composition into the mold; c) reducing the pressure within the mold; d) maintaining the mold at about the reduced pressure; e) allowing the curable resin composition to impregnate the fiber preform; f) heating the impregnated fiber preform at a temperature of at least about 100° C. or at least about 150° C. for a period of time to produce an at least partially cured fiber-reinforced composite article; and optionally subjecting the at least partially cured fiber-reinforced composite article to post curing operations at a temperature of from about 100° C. to about 350° C.

The process of the invention is useful to make a wide variety of fiber-reinforced composite articles, including various types of aerospace structures and automotive, rail and marine structures. Examples of aerospace structures include primary and secondary aerospace structural materials (wings, fuselages, bulkheads, flap, aileron, cowl, fairing, interior trim, etc.), rocket motor cases, and structural materials for artificial satellites. Examples of automotive structures include vertical and horizontal body panels (fenders, door skins, hoods, roof skins, decklids, tailgates and the like) and automobile and truck chassis components.

Although making and using various embodiments of the present invention have been described in detail above, it should be appreciated that the present invention provides many applicable inventive concepts that can be embodied in a wide variety of specific contexts. The specific embodiments discussed herein are merely illustrative of specific ways to make and use the invention, and do not delimit the scope of the invention.

EXAMPLES

Example 1

An exemplary resin formulation was prepared using ingredients listed for "Ex. 1" in Table 1. The formulation was prepared by blending each epoxy resin (Araldite® GY 285, Araldite® MY 0610, Araldite® MY 721 available from Huntsman International LLC or an affiliate thereof) together at room temperature (i.e., about 23° C.) followed by heating the resin to 70° C. and adding a polyethersulfone commercially sold as Virantage® VW-10200 RFP (available from Solvay Specialty Polymers USA, LLC). The mixture was then heated to 120° C. and vacuum applied for about 30 minutes to dissolve the polyethersulfone and remove volatiles. The mixture was then cooled to 90° C. and the rest of the ingredients set forth in Table 1 for Ex. 1 were mixed into the resin thoroughly.

Prepreg was prepared using the above-described exemplary formulation with unidirectional carbon fibers (12K, 185 grams per square meter, gsm) to achieve 36 wt % resin in the total uncured prepreg. Uncured layups were prepared to test laminates according to ASTM methods (as described below) for the laminate properties set forth in Table 1. The layups were cured in an autoclave using typical manufacturing techniques at temperatures of about 180° C. for 2 hours.

Several 12-ply laminates with unidirectional layup and a thickness of about 2.1 mm were created and subjected to the following tests: ASTM D3039 to measure tensile strength; ASTM D6641 to measure compression strength; and ASTM D2344 to measure interlaminar shear strength.

In order to measure compression strength after impact, a 32-ply laminate having a layup following the configuration (+45, 0, −45, +90)n and a thickness of about 5.5 mm thick was impacted with 30 J following ASTM D7136 and evaluated following ASTM D7137.

Environmental conditioning of the composites was performed by immersing the samples in 100° C. water for 3 days prior to hot-wet mechanical evaluation.

Comparative Examples 1-3

Comparative examples 1-3 (Comp. 1, Comp. 2, & Comp. 3) were prepared, cured, and evaluated in the same manner as Example 1 described above. Each prepreg used a different formulation by replacing the aliphatic polyketone toughener with a chemically unique toughener (i.e. polyamide/nylon, aromatic polyketone, and core-shell rubber). The same carbon fiber and manufacturing methods were employed to produce the prepreg laminates. The same ASTM test methods and laminate orientation/thicknesses were used to evaluate tensile strength, compression strengths, and interlaminar strength.

TABLE 1

|  | Ex. 1 | Comp. 1 | Comp. 2 | Comp. 3 |
| --- | --- | --- | --- | --- |
| Compositions |  |  |  |  |
| ARALDITE ® GY 285 | 17.15 | 17.15 | 17.15 | 17.15 |
| ARALDITE ® MY 0610 | 25.93 | 25.93 | 25.93 | 25.93 |
| ARALDITE ® MY 721 | 10.37 | 10.37 | 10.37 | 10.37 |
| ARADUR ® 4,4'-DDS | 21.57 | 21.57 | 21.57 | 21.57 |
| Virantage ® VW-10200 RFP | 15.56 | 15.56 | 15.56 | 15.56 |
| Ketoprix ® EK 63 | 4.71 |  |  |  |
| Orgasol ® 1002 |  | 4.71 |  |  |
| Orgasol ® 3502 | 4.71 | 4.71 | 4.71 | 4.71 |
| Ketaspire ® KT 820 SFP |  |  | 4.71 |  |
| Clearstrength XT 100 DSC |  |  |  | 4.71 |
| Uncured Tg (° C.) | −4 | −3 | −1 | −5 |
| DMA (Tg) (° C.) | 195 | 195 | 200 | 173 |
| Laminate Properties Compression strength (ksi) |  |  |  |  |
| Dry | 170 | 160 | 139 | 129 |
| Hot/wet | 139 | 123 | 124 | 121 |
| Tensile strength (ksi) |  |  |  |  |
| Dry | 380 | 352 | 360 | 372 |
| Hot/wet | 302 | 308 | 332 | 350 |
| ILSS (ksi) |  |  |  |  |
| Dry | 13.3 | 13.6 | 12.4 | 9.99 |
| Hot/wet | 11.9 | 10.3 | 11.1 | 7.97 |
| CAI (30 J impact) | 44.2 | 44.0 | 41.2 | 28.6 |

Referring to Table 1, ARADURE® 4,4'-DDS is an epoxy curing agent available from Huntsman International LLC or an affiliate thereof. Ketoprix® EK 63 is a polyketone toughener commercially available from Esprix Technologies. Orgasol® 1002 and Orgasol® 3502 are spheroidal polyamides commercially available from Arkema. Ketaspire® KT 820 SFP is a unreinforced polyetheretherketone (PEEK) commercially available from Solvay. Clearstrength® XT 100 is a methylmethacrylate-butadiene-styrene ("MBS") core-shell additive powder commercially available from Arkema.

Results in Table 1 show a clear increase in compressions strengths and especially in compression and interlaminar shear strengths after hot-wet conditioning for the exemplary formulation using aliphatic polyketone over those comparative examples using nylon, polyetheretherketone, and core-shell rubber tougheners. Additionally, high damage tolerance, as measured by compression strength after impact, was observed. This higher performance does not detrimentally affect other beneficial properties such as the glass transition temperature (Tg), the processing, or tack of the prepreg. A person of ordinary skill in the art would expect similar benefits for the various embodiments of the curable resin composition disclosed herein.

What is claimed is:

1. A curable resin composition comprising (a) from wt. % to wt. %, based on the total weight of the curable resin composition, of a thermoset resin, (b) from 2 wt. % to 12.5 wt. %, based on the total weight of the curable resin composition, of an aliphatic polyketone toughener, and (c) from 15 wt. % to 25 wt. %, based on the total weight of the curable resin composition, of a hardener, and from 15 wt. % to 25 wt. %, based on the total weight of the curable resin composition, of an additional toughener, wherein the curable resin has a glass transition of at least 190° C. after curing.

2. The curable resin composition of claim 1, wherein the thermoset resin is an epoxy resin.

3. The curable resin composition of claim 2, wherein epoxy resin is selected from a difunctional epoxy resin, a trifunctional epoxy resin, a tetrafunctional epoxy resin and a mixture thereof.

4. The curable resin composition of claim 2, wherein the aliphatic polyketone is a linear alternating polymer of carbon monoxide and ethylene.

5. The curable resin composition of claim 2, wherein the aliphatic polyketone is a terpolymer of carbon monoxide, ethylene and one of propylene, n-butene, n-octene or n-dodecene.

6. The curable resin composition of claim 1, wherein the additional toughener comprise polyether sulphone, polyether ethersulphone, polyphenyl sulphone, polysulphone, polyimide, polyetherimide, aramid, polyamide, polyester, polyetheretherketone, polyurethane, polyurea, polyarylether, polyarylsulphides, polycarbonates, polyphenylene oxide, modified polyphenylene oxide or a mixture thereof.

7. A fiber-reinforced resin composition comprising reinforcing fibers and the curable resin composition of claim 1.

8. The fiber-reinforced resin composition of claim 7, wherein the reinforcing fibers are selected from graphite fibers, glass fibers, fibers formed of silicon carbide, fibers formed of alumina, fibers formed of boron, fibers formed of quartz, fibers formed from an organic polymer and a mixture thereof.

9. The fiber-reinforced resin composition of claim 7, wherein the reinforcing fibers are present in an amount of about 50 wt. % to about 90 wt. % by weight, based on the total weight of the fiber-reinforced resin composition.

10. A method of producing a fiber-reinforced composite article including the steps of: (i) contacting reinforcing fibers with the curable resin composition of claim 1 in a mold to coat and/or impregnate the reinforcing fibers; and (ii) curing the coated and/or impregnated reinforcing fibers at a temperature of at least about 60° C.

11. A fiber-reinforced composite article produced according to the method of claim 10.

12. The fiber-reinforced composite article of claim 11, wherein the composite article is a primary or secondary aerospace structural material.

13. A method of producing a fiber-reinforced composite article including the step of: contacting reinforcing fibers with the curable resin composition of claim 1 to coat and/or impregnate the reinforcing fibers and curing the coated and/or impregnated reinforcing fibers.

14. A method of producing a fiber-reinforced composite article in a RIM system including the steps of: a) introducing a fiber preform comprising reinforcing fibers into a mold; b) injecting the curable resin composition of claim 1 into the mold; c) allowing the curable resin composition to impregnate the fiber preform; d) heating the impregnated fiber preform at a temperature of least about 60° C. for a period of time to produce an at least partially cured fiber-reinforced composite article; and e) optionally subjecting the partially cured fiber-reinforced composite article to post curing operations at a temperature of from about 100° C. up to about 350° C.

15. A method of producing a fiber-reinforced composite article in a VaRTM system including the steps of: a) introducing a fiber preform comprising reinforcing fibers into a mold; b) injecting the curable resin composition of claim 1 into the mold; c) reducing the pressure within the mold; d) maintaining the mold at about the reduced pressure; e) allowing the curable resin composition to impregnate the fiber preform; f) heating the impregnated fiber preform at a temperature of at least about 60° C. for a period of time to produce an at least partially cured fiber-reinforced composite article; and optionally subjecting the at least partially cured fiber-reinforced composite article to post curing operations at a temperature of from about 100° C. to about 350° C.

\* \* \* \* \*